United States Patent [19]

Takeda et al.

[11] Patent Number: 4,812,622

[45] Date of Patent: Mar. 14, 1989

[54] APPARATUS FOR DEFROSTING FROZEN ARTICLES

[75] Inventors: Yukimasa Takeda; Yuji Wakatuki, both of Toyoake, Japan

[73] Assignee: Hoshizaki Electric Co., Ltd., Toyoake, Japan

[21] Appl. No.: 13,421

[22] Filed: Feb. 11, 1987

[30] Foreign Application Priority Data

Feb. 19, 1986 [JP] Japan .................................. 61-32766

[51] Int. Cl.⁴ ......................... H05B 1/02; F25B 29/00
[52] U.S. Cl. .................................... 219/400; 219/364;
219/413; 126/21 A; 165/17; 165/48.1; 165/61;
165/64
[58] Field of Search ....................... 219/364, 400, 413;
62/82, 156, 275; 165/30, 61, 64, 48.1, 17;
126/21 R, 21 A

[56] References Cited

U.S. PATENT DOCUMENTS

| | | | |
|---|---|---|---|
| 3,261,394 | 7/1966 | Foster et al. | 165/64 |
| 3,368,062 | 2/1968 | Gramenius et al. | 126/21 A |
| 3,548,153 | 12/1970 | Kells | 219/413 |
| 3,692,100 | 9/1972 | Gallagher, Jr. | 165/64 |
| 3,780,794 | 12/1973 | Staub | 126/21 A |
| 3,818,977 | 6/1974 | Lohr | 165/30 |
| 4,117,881 | 10/1978 | Williams et al. | 165/30 |
| 4,307,286 | 12/1981 | Guibert | 126/21 A |
| 4,509,586 | 4/1985 | Watabe | 165/64 |

*Primary Examiner*—Samuel Scott
*Assistant Examiner*—John K. Ford
*Attorney, Agent, or Firm*—Wenderoth, Lind & Ponack

[57] ABSTRACT

A defrosting apparatus including a housing defining a space for accommodating therein articles to be defrosted, a heater for heating the air within the housing, and an air circulation fan for circulating the heated air so that it flows through the space. The apparatus further includes a first temperature sensor disposed on the air outlet side of the circulation fan for sensing the temperature of the outlet air flowing out from the circulation fan to produce a first detection signal, a second temperature sensor disposed at the air inlet side of the circulation fan for detecting the temperature of the air flowing into the circulation fan to produce a second detection signal and a controller coupled to the first and second sensors for receiving the first and second detection signals, respectively, to thereby control the operation of the defrosting apparatus. The controller includes a first comparator for comparing the temperature represented by the second detection signal with a defrosting start temperature to energize the heater when the former is lower than the latter, a second comparator for comparing the first detection signal with a reference signal to selectively deenergize or energize the heater on the basis of the reference signal, and a third comparator for comparing the temperature represented by the second detection signal with a defrosting end temperature to complete the defrosting operation when the former is higher than the latter.

2 Claims, 5 Drawing Sheets

APPARATUS FOR DEFROSTING FROZEN ARTICLES

BACKGROUND OF THE INVENTION

1. Field of the Invention

The present invention relates generally to a thawing or defrosting apparatus and, more particularly, to a defrosting apparatus capable of defrosting frozen articles such as frozen foods without incurring an undesired temperature rise thereof which would adversely influence such foods.

2. Description of the Prior Art

There have heretofore been known defrosting apparatuses such as a defroster box and a combined defrosting and refrigerating box for defrosting frozen foods or the like such as fresh-meat, fish, shell fish, vegetables, fruits etc. In the defrosting operation of the hitherto known defrosting apparatus, it has been observed that when a defrosting heater is electrically energized continuously for effectuating the defrosting operation, some of the foods are subjected to adverse influences such as by degradations in quality due to an excessive rise in temperature upon completion of defrosting of all the foods. Under such circumstances, a control has been adopted in which a temperature range is so set that the temperature of the hot air discharged from an air circulation fan is allowed to vary within a preset temperature range, wherein the defrosting heater is turned on and off at temperature levels corresponding to the respective lower and upper limits of the temperature range so that the temperature of the outlet air discharged from the circulation fan will not be increased excessively. This is however disadvantageous in that consistent control of the amount of time required for the defrosting can not be realized since identical defrosting completion temperatures can not always be detected because the temperature of the inlet air drawn in by the air circulation fan is not stable. Furthermore, in the case of combined defrosting and refrigerating apparatuses in general, the defrosting operation is controlled by detecting the defrosting start temperature (i.e. the temperature at which the defrosting operation is to be started) and the defrosting completion temperature (i.e. the temperature at which the defrosting operation is to be completed), while the refrigerating operation is controlled by detecting preset lower and upper limits of the interior temperature (also referred to as intra-box temperature). However, in view of the fact that the temperature range set for the control of the defrosting operation differs from that set for the refrigerating operation control, it is necessary to provide two temperature sensors or thermostats, one for the former and the other for the latter. Besides, in the case of the defroster, there is another disadvantage in that when the interior temperature is higher than the defrosting start temperature, the defrosting start switch is not allowed to be closed until the interior temperature has been lowered to the defrosting start temperature.

SUMMARY OF THE INVENTION

In view of the disadvantages of the hitherto known defrosting apparatuses described above, it is an object of the present invention to provide a defrosting apparatus which is improved so as to remove such disadvantages and which is capable of protecting foods against an undesirable temperature rise while stably defrosting the frozen foods disposed within the apparatus at a uniform or consistent temperature during every defrosting operation.

Another object of the present invention is to provide a combined defrosting and refrigerating apparatus which incorporates therein the features mentioned above and which is capable of storing the foods or the like in a cooled or refrigerated state after they have been defrosted.

According to one aspect of the invention, there is provided a defrosting apparatus including a housing defining a space for accommodating therein articles to be defrosted, a heat generating means for heating the air within the housing, and an air circulation fan for circulating the air heated by the heat generating means so that the heated air flows through the article accommodating space, the apparatus comprising a first temperature detecting means disposed on the air outlet or discharge side of the circulation fan for sensing the temperature of the outlet air flowing out from the circulation fan to therby produce a first detection signal, a second temperature detecting means disposed on the air inlet or suction side of the circulation fan for detecting the temperature of the air flowing into the circulation fan to thereby produce a second detection signal, and a controller associated with the first and second detection means for receiving the first and second detection signals, respectively, to control the defrosting operation of the defrosting apparatus, wherein the controller includes a means for comparing the temperature represented by the second detection signal with a defrosting start temperature to energize the heat generating means when the former is lower than the latter, a means for comparing the first detection signal with a reference signal to selectively deenergize or energize the heat generating means on the basis of the reference signal, and a means for comparing the temperature represented by the second detection signal with a defrosting completion signal to thereby complete the defrosting operation when the former becomes higher than the latter.

According to another aspect of the invention, there is provided a combined defrosting and refrigerating apparatus including a housing defining an article accommodating space, a defrosting heater disposed within the housing for heating the intra-housing air, a circulation fan for circulating the intra-housing air through the accommodating space, and a cooling system incorporating an evaporator for cooling the intra-housing air and a compressor for supplying a coolant to the evaporator, the apparatus comprising a first temperature detecting means disposed on the air outlet side of the circulation fan for detecting the temperature of the air flowing out from the circulation fan to output a first detection signal, a second temperature detecting means disposed on the air inlet side of the circulation fan for detecting the temperature of the air flowing into the circulation fan to output a second detection signal, and a controller coupled to the first and second temperature detecting means for receiving the first and second detection signals, respectively, wherein the controller includes a defrosting start switch for selecting from refrigerating and defrosting operation modes of the apparatus the defrosting operation mode, and heater control means and cooling system control means for controlling actuation of the defrosting heater or the cooling system depending on whether the apparatus is in the refrigerating operation mode or in the defrosting operation mode, and wherein the cooling system control means receives the second detection signal from the second temperature detecting means for comparing the temperature represented by the second detection signal with a preset temperature range to actuate the cooling system when the second detection signal indicates the upper limit signal of the temperature range while stopping the operation of the cooling system when the second detection signal indicates the lower limit of the temperature range in the refrigerating operation mode of the apparatus, the heater control means including a comparing/energizing means for comparing the temperature represented by the second detection signal derived from the second temperature detecting means with a defrosting start temperature in the defrosting operation mode of the apparatus to energize the defrosting heater when the temperature represented by the second detection signal is lower than the defrosting start temperature, a means for comparing the first detection signal with a reference signal for selectively deenergizing or energizing the defrosting heater on the basis of the reference signal independent of the defrosting heater energizing means, and a means for comparing the temperature represented by the second detection signal with a defrosting completion temperature for deenergizing the defrosting heater when the former is higher than the latter to thereby complete the defrosting operation mode while energizing the cooling system.

The aforementioned comparing/energizing means may include a means for energizing the cooling system when the temperature detected by the second detection means is higher than the defrosting start temperature while deenergizing the cooling system when the former is lower than the latter. In the defrosting operation mode, the refrigerating operation is performed when the temperature detected by the second temperature detecting means at the point in time the defrosting mode is actuated is higher than the defrosting start temperature. Subsequently, at the point in time when the defrosting start temperature has been attained, the operation mode is changed over to the defrosting operation during which energization of the defrosting heater is controlled so that the temperature of the outlet air blown out from the circulation fan is maintained constant. At a point in time when the temperature of the inlet air flowing into the circulation fan has attained the defrosting completion temperature, the defrosting operation is completed whereby the refrigerating operation mode is automatically restored. With this arrangement, there is provided a highly automated defrosting and refrigerating apparatus which can thus significantly reduce troublesome manual operation while avoiding excessive increases in temperature which otherwise would adversely influence the articles stored therein such as foods.

BRIEF DESCRIPTION OF THE DRAWINGS

For a better understanding of the present invention reference may be had to the accompanying drawings, in which.

DESCRIPTION OF THE PREFERRED EMBODIMENT

In the following, a preferred embodiment of the present invention will be described in detail with reference to the accompanying drawings, in which the invention is applied, by way of example, to a combined defrosting and refrigerating apparatus.

Figure 1:
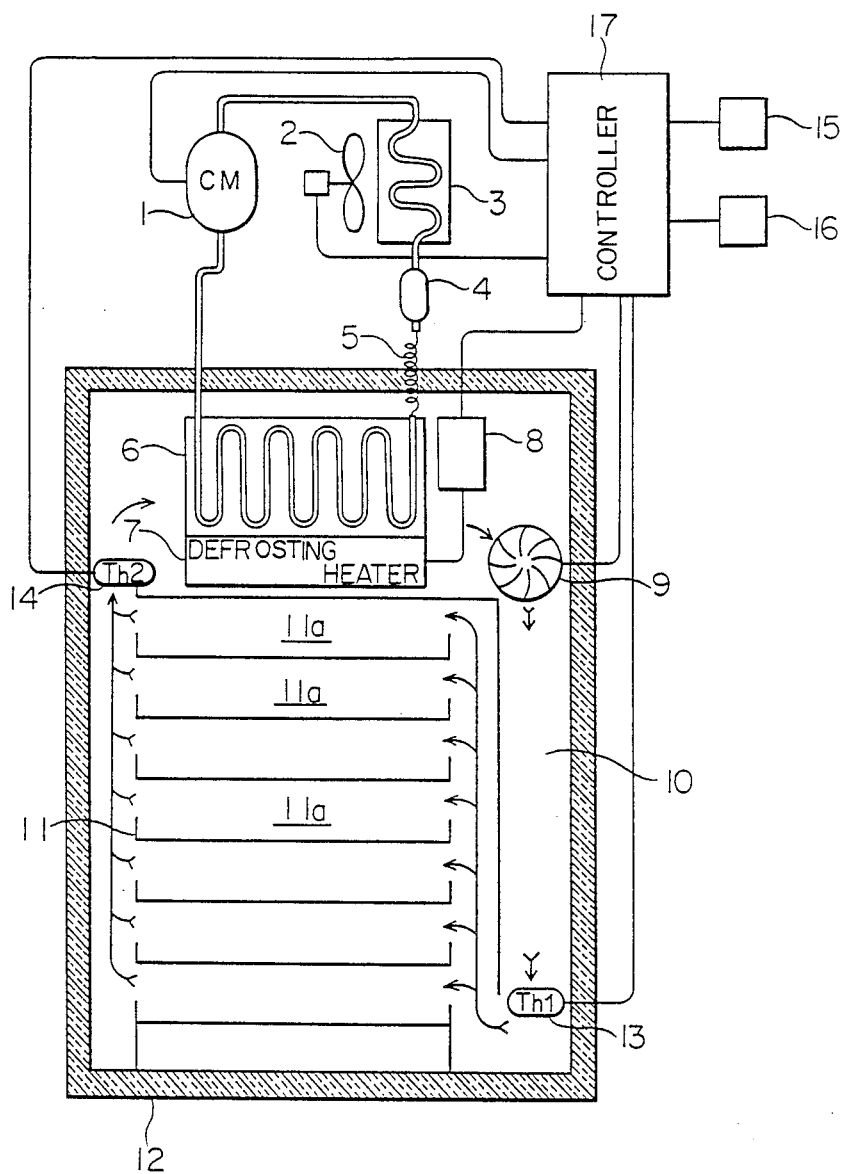
FIG. 1 is a schematic view showing in elevation, with portions shown in cross-section, a combined defrosting and refrigerating apparatus to which an embodiment of the defrosting apparatus according to the present invention is applied.

Referring to FIG. 1 there is shown schematically a general arrangement of a combined defrosting and refrigerating apparatus embodying the present invention, wherein reference numeral 12 denotes a box-like housing essentially made of a heat insulating material. A defrosting heater 7 and an intra-box air circulation fan 9 (i.e. fan circulating the air within the box-like housing) are provided within the box-like housing 12. Upon operation of the intra-box air circulation fan 9, the latter causes an air flow to be created through a duct 10 and spaces 11a defined between shelves 11 and which circulates as indicated by arrows. Disposed at an appropriate location (hereinafter referred to as an outlet port) within the duct 10 located on the discharge side of the air circulation fan 9 is a temperature sensor (Th1) 13 for detecting the air temperature at the outlet port, while there is disposed on the air exit side of the space 11a and preferably above the uppermost shelf 11, i.e. on the suction side of the air circulation fan 9 (hereinafter referred to as the inlet port) a temperature sensor (Th2) 14 for detecting the air temperature in the inlet port, wherein both of the temperature sensors 13 and 14 are electrically connected to a control circuit 17 also referred to as a controller.

Mounted fixedly in a conventional manner above the topmost shelf within the box-like housing 12 is an evaporator 6 which is connected to a compressor 1, a condenser 3, a dryer 4 and a capillary tube 5 in the manner shown in FIG. 1 to thereby constitute a cooling system of a known arrangement. Reference numeral 2 denotes a cooling fan for the condenser 3. The aforementioned defrosting heater 7 is disposed between the evaporator 6 and the uppermost shelf 11 and is connected to a thermostat 8 provided for the purpose of protecting the defrosting heater 7. The compressor 1, the defrosting heater 7 and the protecting thermostat 8 mentioned above are also connected electrically to the controller 17.

Further connected to the controller 17 are a defrosting start switch 15 serving for changing back and forth between the refrigerating mode and the defrosting mode as will be described hereinafter and a defrosting mode indicator lamp 16 which is lit during the defrosting operation mode. The control circuit or controller 17 is so arranged as to respond to the signals supplied from the outlet air temperature sensor 13 and the inlet air temperature sensor 14 for controlling the defrosting and refrigerating operations by supplying appropriate control signals to the compressor 1, cooling fan 2, defrosting heater 7, the intra-box air circulation fan 9 and others.

In the case of the illustrated embodiment, the defrosting start switch 15 is constituted by a momentary type push-button switch which can be closed by being depressed by a user while opened when the switch is released. It should however be noted that the controller 17 remains in the defrosting operation mode once the defrosting start switch 15 is pushed even when the switch is subsequently released. Thus, the defrosting mode indicator lamp 16 continues to be lit, indicating that the apparatus is in the defrosting mode. At the end of the defrosting operation, the control circuit 17 is automatically changed over to the refrigerating mode.

Next, operation of the apparatus will be described in detail with reference to FIG. 1. In the refrigerating operation mode, the combined defrosting and refrigerating apparatus shown in FIG. 1 operates as a refrigerator while operating as a defroster or thawing machine in the defrosting operation mode. In the refrigerating operation mode, the air cooled down through heat exchange with the evaporator 6 of the cooling system is discharged from the intra-box circulation fan 9 into the interior space within the housing through the duct 10 to cool foods and the like disposed on the shelves 11 and then fed back to the evaporator 6 through the inlet port. In this refrigerating operation mode, the controller 17 responds to the signal supplied from the temperature sensor 14 mounted at the inlet port for turning on and off the compressor 1 and the cooling fan 2 so that the interior temperature within the housing can be maintained at a temperature level within a predetermined range of temperature.

Figure 2:
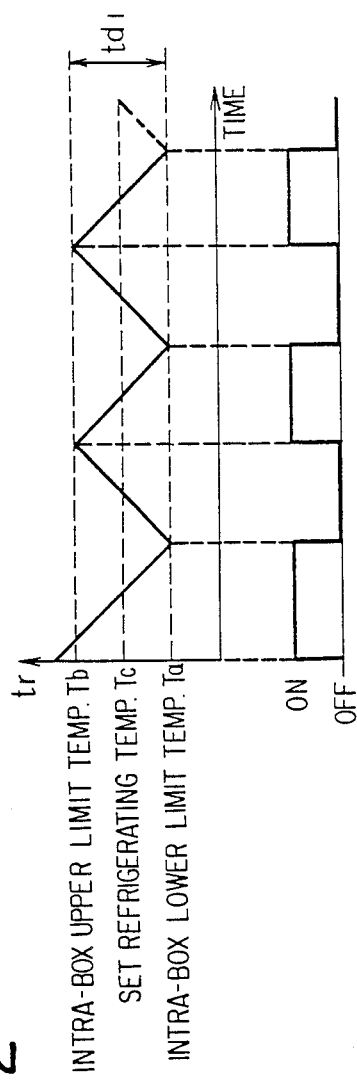
FIG. 2 is a timing chart for illustrating variation in the intra-housing temperature and the refrigerating operation when the defrosting apparatus is operated in the refrigerating mode according to the present invention.

The control process to this end is illustrated in FIG. 2. More specifically, FIG. 2 graphically illustrates a relationship between the intra-box temperature detected at the inlet port and the on/off operation of the compressor 1 and the cooling fan 2, wherein the inlet air temperature tr is taken along the ordinate while the time t is taken along the abscissa. In FIG. 2, a reference symbol Tc represents a set refrigeration temperature, Ta represents a lower limit of the intra-box temperature, Tb represents an upper limit of the intra-box temperature, and $td_1$ represents the width or range within which the intra-box temperature is allowed to vary. In other words, $td_1 = Tb - Ta$. The waveform shown at the bottom row in FIG. 2 represents the on/off periods of the cooling system. During the ON-period, both the compressor 1 and the cooling fan 2 are operated. On the other hand, in the OFF-period, both the compressor 1 and the fan 2 are deenergized or stopped. As will be seen in FIG. 2, when the inlet air temperature sensor 14 detects the lower limit Ta of the intra-box temperature, the cooling system is turned off. Thereafter, upon detection of the intra-box temperature reaching the upper limit temperature Tb due to increases in the temperature within the housing, the cooling system is again turned on. In this manner, the intra-box temperature within the housing is maintained in the temperature range defined between the lower limit Ta and the upper limit Tb.

Upon closing of the defrosting start switch 15, the apparatus is set to the defrosting mode, which is indicated by the lighting of the defrosting mode indication lamp 16. In this defrosting operation mode, control is first so performed that the outlet air temperature can be maintained constant, as will be described hereinafter in conjunction with FIGS. 5 to 8. On the other hand, when the inlet air temperature sensor 14 detects a temperature lower than a predetermined level at which the defrosting operation is to be started, the defrosting heater 7 is electrically energized to warm up the interior of the housing. Upon detection of the temperature which is higher than the defrosting start temperature and at which the defrosting operation is to be stopped, the defrosting operation mode is completed and is automatically changed over to the refrigerating mode under the control of the controller 17. When the defrosting start switch 15 is closed to effect the defrosting operation mode, the cooling system remains in the energized state to continue the cooling operation, provided that the temperature detected by the inlet air temperature sensor 14 is higher than the defrosting start temperature. At the time the defrosting start temperature is detected, the cooling system is deenergized while the defrosting heater 7 is energized under the control of the control circuit 17.

Figure 3:
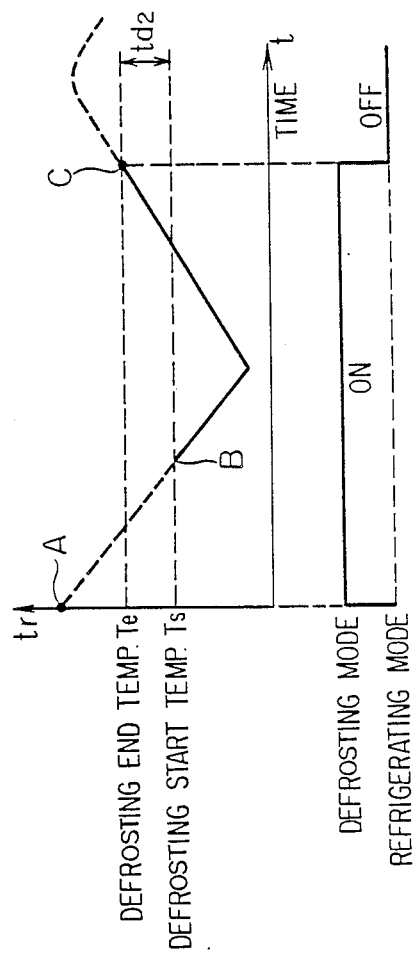
FIG. 3 is a timing chart for illustrating variations in the intra-housing temperature and the defrosting operation when the defrosting apparatus is operated in the defrosting mode upon detection of an inlet air temperature which is higher than a defrosting start temperature according to the teaching of the present invention.
Figure 4:
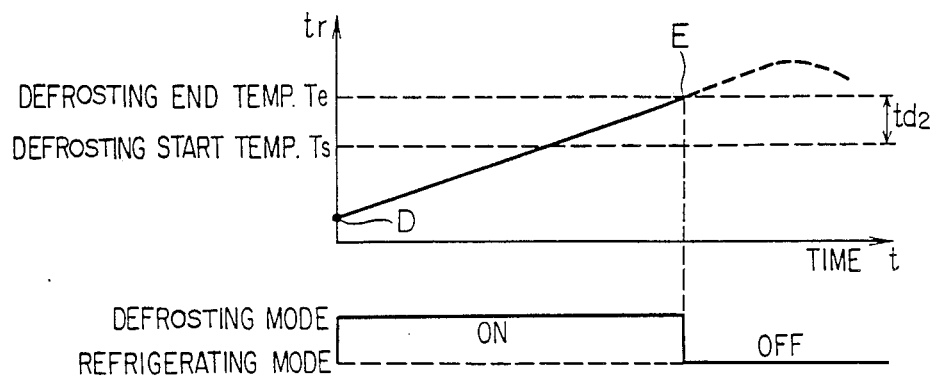
FIG. 4 is a timing chart for illustrating variations in the intra-housing temperature and the defrosting operation when the defrosting apparatus is operated upon detection of inlet air temperature which is lower than the defrosting start temperature according to the present invention.

The control process briefly discussed above will be explained in more detail by referring to FIGS. 3 and 4, in which FIG. 3 graphically illustrates a case where the temperature detected by the inlet air temperature sensor 14 is higher than defrosting start temperature when the defrosting mode is set by the defrosting start switch 15, while FIG. 4 illustrates a case where the detected temperature is lower than the defrosting start temperature at the time when the defrosting mode is set. In both of FIGS. 3 and 4, the inlet air temperature tr detected by the inlet air temperature sensor 14 is taken along the ordinate with time t being taken along the abscissa. Further, a symbol Ts represents the defrosting start temperature at which the defrosting operation is to be started, and Te represents the defrosting completion temperature at which the defrosting operation is to be stopped or ended. In the waveform representative of the relationship between the inlet air temperature tr and the time, a solid line curve portion represents the defrosting operation, while broken line curves represent the refrigerating operation. A waveform shown below the abovementioned waveform and labelled "ON" represents the defrosting mode, i.e. the energized state of the defrosting mode indicator lamp 16, while a waveform shown at the bottom and labelled "OFF" indicates the refrigerating mode, i.e. the deenergized state of the defrosting mode indicator lamp 16. Further, a width $td_2$ is given by $td_2 = Te - Ts \geq 0$.

As will be seen in FIG. 3, when the defrosting start switch 15 is closed at a temperature level A which is higher than the defrosting start temperature Ts to thereby set the defrosting mode, the defrosting heater 7 is not yet energized regardless of the defrosting mode, and the refrigerating operation is continued. As a consequence, the temperature tr is lowered down to a point B. At this time, when the defrosting start temperature Ts is detected by the inlet air temperature sensor 14, the cooling system is deenergized while the defrosting heater 7 is energized, whereupon the defrosting operation is started. Subsequently, when the inlet air temperature sensor 14 detects the defrosting completion temperature Te at a point C as the intra-box temperature rises, the defrosting mode is stopped or ended, whereby the defrosting heater 7 is deenergized while the cooling system is automatically energized to establish the refrigerating operation mode.

Referring to FIG. 4, when the defrosting start switch 15 is closed at a point D lower than the defrosting start temperature Ts, the defrosting heater 7 is immediately energized to start the defrosting operation. Subsequently, upon detection of the defrosting completion temperature Te at a point E, the defrosting mode is completed, whereupon the defrosting mode is automatically changed over to the refrigerating mode.

According to the present invention, the defrosting heater 7 is proportionally controlled during the defrosting operation so that the outlet air temperature detected by the temperature sensor 13 mounted at the discharge port of the air circulation fan 9 is maintained to be constant for defrosting the articles disposed on the shelves within the housing, as described hereinbefore. For having a better understanding of this control operation, the control performed for maintaining the outlet air temperature to be constant will be described comparatively with the hitherto known apparatus in which such control is not carried out, by referring to FIGS. 5 to 8.

Figure 5:
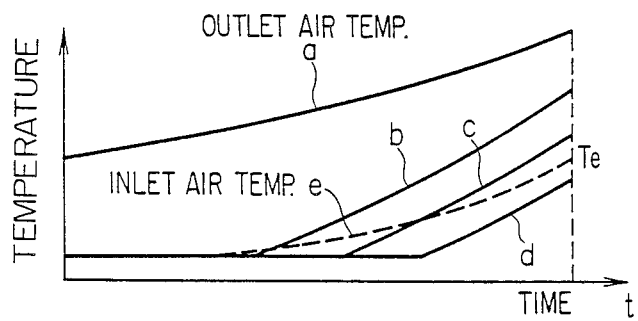
FIG. 5 is a timing chart for illustrating a defrosting mode operation of a hitherto known defrosting and refrigerating apparatus in which a defrosting heater is energized continuously.
Figure 6:
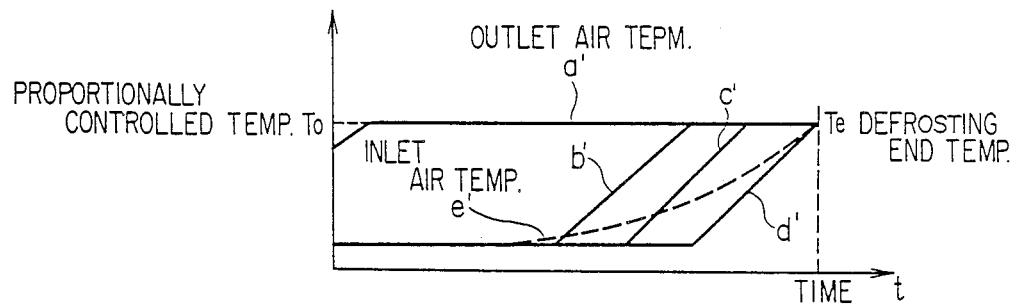
FIG. 6 is a timing chart for illustrating a defrosting mode operation of a combined defrosting and refrigerating apparatus when a proportional control of the defrosting heater is performed so as to maintain the outlet air temperature constant.

FIG. 5 is a view for graphically illustrating relationships among the outlet air temperature, the inlet air temperature and the temperature of foods and the like to be defrosted in the case where the defrosting heater 7 is energized in a continuous manner according to the prior art technique. FIG. 6 is a view similar to FIG. 5 for illustrating behavior of the temperatures mentioned above. In FIGS. 5 and 6, the temperature is taken along the ordinate with time taken along the abscissa. Curves a and a' represent the temperatures at the outlet port, curves e and e' represent the temperatures at the inlet port, Te represents a set temperature at which the defrosting operation is to be ended, a curve To represents the preset proportionally controlled temperature, curves b and b' represent temperatures of foods or the like which can be defrosted at a high rate, curves, c and c' represent the temperatures of foods or the like for which defrosting proceeds at a standard rate, and curves d and d' represent temperatures of foods or the like which are defrosted at a low rate.

Referring to FIG. 5, when the defrosting heater 7 is energized continuously, the outlet air temperature becomes high as the defrosting proceeds. In the case of the foods or the like which can be defrosted at a higher rate, a considerably higher temperature will be attained at the end of the defrosting operation, giving rise to the possibility that the foods and the like may be adversely affected. In contrast, in the case illustrated in FIG. 6, the temperature of the foods and the like is prevented from rising beyond the outlet air temperature and thus can be protected against adverse effects even at a point in time close to the end of the defrosting operation, because of the proportional control of the defrosting heater 7.

Figure 7:
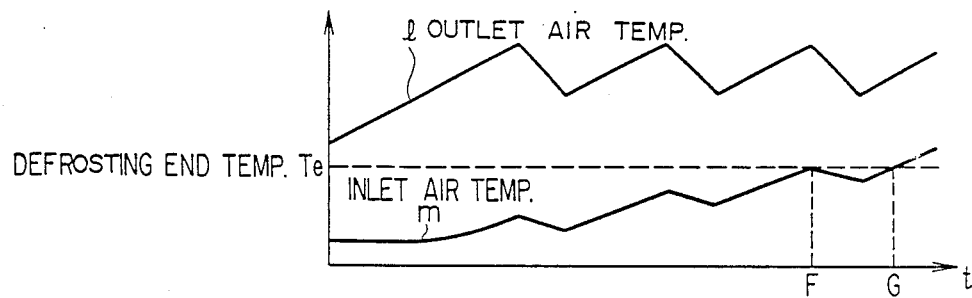
FIG. 7 is a timing chart for illustrating a defrosting operation of a hitherto known combined defrosting and refrigerating apparatus in the case where control is performed within a preset temperature range.
Figure 8:
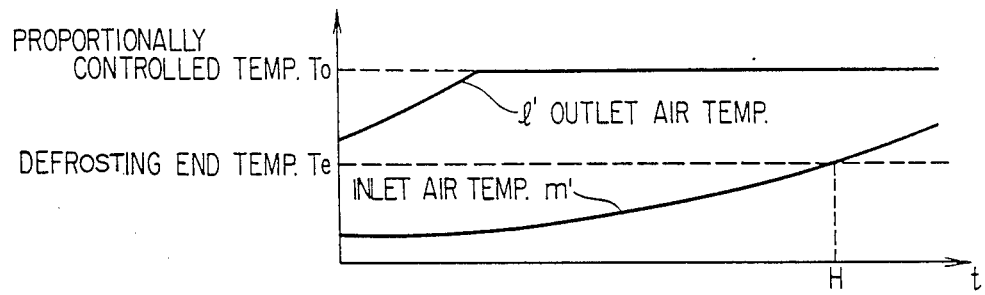
FIG. 8 is a timing chart for illustrating a defrosting mode operation of a combined defrosting and refrigerating apparatus when the outlet-air temperature is so controlled as to be increased continuously according to the teaching of the present invention.

Next, the proportional control according to the invention illustrated in FIG. 8 will be described comparatively with the control of the outlet air temperature performed within a predetermined range according to the prior art technique (FIG. 7). As with the cases of FIGS. 5 and 6, the temperature is taken along the ordinate with time taken along the abscissa in FIGS. 7 and 8. A reference symbol Te represents the defrosting completion temperature, l and l' represent the temperatures detected at the outlet port, and m and m' represent temperatures detected at the inlet port. Referring to FIG. 7, when the outlet air temperature is controlled so as to allow variations thereof within the predetermined range as indicated by the curve l, variations also occur in the inlet air temperature m. In the region near the defrosting completion temperature Te, a small variation or change in the inlet air temperature m causes the defrosting completion temperature to vary significantly, as indicated by a point F or a point G, making it impossible to detect the defrosting completion temperature Te in a steady manner. In contrast, according to the present invention, the inlet air temperature m' is increased steadily, thus allowing the defrosting completion point to be detected at a point H in a steady manner.

Figure 9:
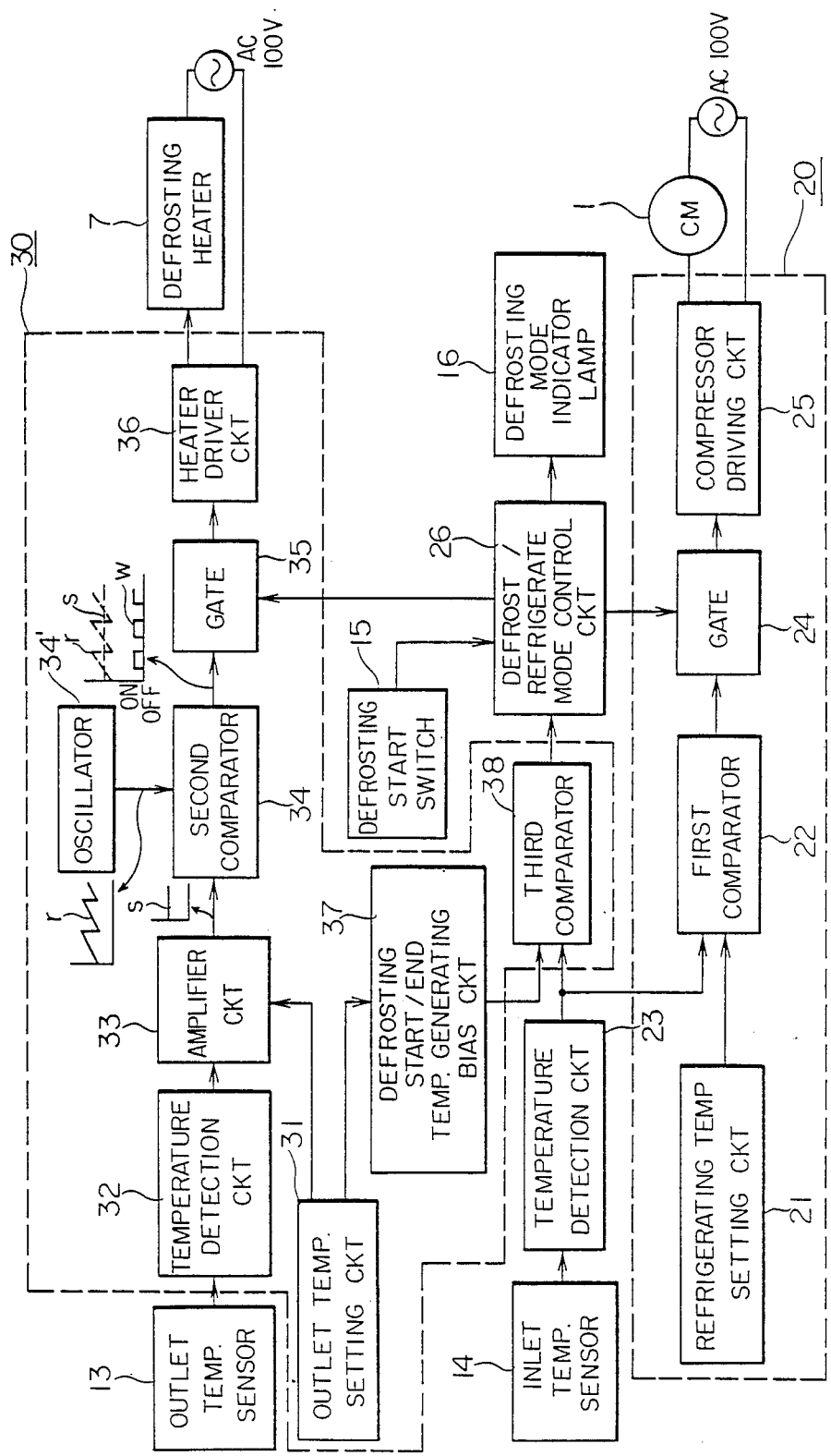
FIG. 9 is a block diagram showing an exemplary embodiment of a controller indicated in FIG. 1 and used in operating the defrosting apparatus according to the invention.

FIG. 9 is a block diagram showing an example of the control circuit indicated by the block 17 in FIG. 1 according to an embodiment of the present invention for performing the control of the operation described above. In FIG. 9, a broken line block 20 indicates a circuit portion for controlling the operation in the refrigerating mode, and a broken line block 30 indicates a circuit portion for controlling the operation in the defrosting mode. In the refrigerating mode, a voltage signal indicative of the set refrigerating temperature Tc shown in FIG. 2 is set in a refrigerating temperature setting circuit 21. A first comparator 22 implemented as a window comparator has one input to which the signal indicative of the set refrigerating temperature Tc is supplied from the refrigerating temperature setting circuit 21 and the other input supplied with a temperature signal which is derived from the output of the inlet air temperature sensor 14 through a temperature detection circuit 23 serving to convert the output of the sensor 14 to a voltage signal. On the basis of the input signals mentioned above, the first comparator 22 outputs a signal for energizing or deenergizing the cooling system between the intra-box upper limit temperature Tb and the intra-box lower limit temperature Ta so that the inlet air temperature is maintained within a predetermined temperature range $td_1$ (see FIG. 2). The output signal of the first comparator 22 is utilized for energizing the compressor 1 through a gate 24 and a compressor driving circuit 25. It should be noted that only the compressor 1 is shown as representative of the cooling system. In the refrigerating mode, the defrosting start switch 15 is not closed, and a defrost/refrigerate mode control circuit 26 outputs a refrigeration command signal to the gate 24 which is thus enabled to pass therethrough the signal produced by the first comparator 22.

When the defrosting start switch 15 is closed to establish the defrosting mode, the defrosting/refrigerating mode control circuit 26 first produces a lamp lighting signal for lighting the defrosting mode indication lamp 16. An outlet air temperature setting circuit 31 serves to set the proportionally controlled temperature To represented by the curve a' in FIG. 6 and the curve l' in FIG. 8. The signal output from the outlet air temperature sensor 13 is converted int a voltage signal through a temperature detection circuit 32 to be subsequently supplied to an amplification circuit 33 which amplifies the voltage signal detected by the temperature detecting circuit 32 with reference to the voltage signal supplied from the outlet air temperature detector 13, whereby an amplified signal s is produced to be applied to a second comparator 34. The amplified signal s has such a characteristic that the signal voltage is increased as the temperature detected by the sensor 13 becomes higher.

The second comparator 34 compares the amplified signal s output from the amplifier 33 with a signal r produced by an oscillator 34' serving as a reference signal source for the second comparator 34. The reference signal r produced by the oscillator 34' may be, for example, of a saw-tooth waveform (or alternatively a triangular waveform) of 1 Hz superposed with a D.C. bias voltage. When the reference signal r is greater than the amplified signal s supplied from the amplifier 33, the second comparator 34 produces an output signal w which triggers the energization of the defrosting heater 7 and otherwise turns off the defrosting heater 7. More specifically, as will be seen in a waveform diagram shown to the right of the second comparator 34 in FIG. 9, the second comparator 34 produces the signal for turning on or off the defrosting heater 7 in the overlapping portions of the amplified signal s and the reference signal r depending on the duration of the overlap (reference is to be made to the waveform w shown on the output side of the second comparator 34 in FIG. 9). In the defrosting operation mode, the amplified signal s usually rises up from a low level and is stabilized at an appropriate point in the overlapping portion. It should be mentioned here that difference between the temperature at which the off signal begins to be output, i.e. the outlet air temperature at which the magnitude of the amplified signal s output from the amplifier circuit 33 coincides with the lower limit of the saw-tooth wave, and the temperature at which only the ON signal begins to be output, i.e. the outlet air temperature at which the magnitude of the amplified signal s coincides with the upper limit of the saw-tooth wave is set to be about 1° C. In this manner, the second comparator 34 outputs the signal w for proportionally controlling the defrosting heater 7.

The output signal w of the second comparator 34 is supplied to a gate 35. When the gate 35 receives the defrosting operation command signal from the defrost-/refrigerate mode control circuit 26, the command signal is transferred through the gate 35 to the heater driver circuit 36 to energize the defrosting heater 7.

The signal output from the outlet air temperature setting circuit 31 is applied also to a defrosting start/end temperature generating bias circuit 37 which is arranged such that on the basis of the signal representative of the preset temperature supplied from the outlet air temperature setting circuit 31, a signal representative of a temperature lower than the preset temperature by a predetermined temperature (in the case of FIG. 8) or a signal representative of a temperature equal to the preset temperature (in the case of FIG. 6) is produced and supplied to a third comparator 38 implemented as a window comparator in which the lower limit of the window is set at the defrosting start temperature Ts with the upper limit of the window set at the defrosting end temperature Te. Thus, when the voltage signal derived from the inlet air temperature sensor 14 and applied to the third comparator 38 through the temperature detecting circuit 23 is beyond the lower limit of the window, the third comparator 38 outputs the refrigerating operation command signal. In response thereto, the defrost/refrigerate mode control circuit 26 outputs the refrigerating operation command signal to perform the refrigerating operation under the control of the circuit portion 20. Subsequently, when the aforementioned voltage signal is lowered below the lower limit of the window, the third comparator 38 outputs the defrosting operation command signal in response to which the defrost/refrigerate mode control circuit 26 outputs the defrosting operation command signal to the gate 35. Thus, the defrosting operation is carried out under the control of the circuit portion 30. When the voltage signal has attained the upper limit of the window, the third comparator 38 again outputs the refrigerating operation command signal, whereby the refrigerating operation is performed under the control of the circuit portion 20. At this stage in which the refrigerating operation is started, the defrosting mode indication lamp 16 is extinguished.

When the refrigerating operation is started after the defrosting operation is once completed, the defrosting-/refrigerating mode control circuit 26 can no longer trigger the defrosting operation even when the voltage signal derived from the output of the inlet air temperature sensor 14 goes below the lower limit of the window of the third comparator. In other words, the defrost/refrigerate mode control circuit 26 allows the defrosting operation to be carried out only once after the defrosting start switch is closed.

In the foregoing, an embodiment of the control circuit 17 has been described by referring to FIG. 9. It should however be understood that this is only by way of example and other various circuit configurations will readily occur to those skilled in the art for implementing the intended functions of the control circuit 17.

It is apparent from the foregoing that many advantageous features are provided by the present invention over the prior art. In the defrosting mode, the defrosting heater is proportionally controlled with the aid of the outlet air temperature sensor 13. Thus, the outlet air temperature can be maintained substantially constant, whereby an undesired temperature rise can be avoided to protect foods or the like from being adversely influenced. Furthermore, due to the fact that the outlet air temperature is held substantially constant in the defrosting mode, the inlet air temperature is stabilized, whereby the defrosting completion temperature can be detected stably with improved repeatability by monitoring the inlet air temperature. Since only one inlet air temperature sensor is provided at the intake side to perform the defrosting start control, the defrosting completion control and the refrigeration control, a defrosting/refrigerating apparatus can be inexpensively realized with favorable cost-performance. In the defrosting/refrigerating apparatus according to the present invention, such an arrangement is adopted in which when the intra-box temperature is higher than the defrosting start temperature upon closing of the defrosting start switch 15, the refrigerating operation is forcibly performed until the intra-box temperature is lowered to the defrosting start temperature, wherein the defrosting operation is automatically started at the point in time the intra-box temperature has attained the defrosting start temperature. Thus, troublesome procedures such as the manual setting of the refrigerating mode, waiting for attainment of the defrosting start temperature and the manual setting of the defrosting mode at the point in time that the defrosting start temperature has been attained can be rendered unnecessary.

Numerous alterations and modifications of the structure herein disclosed will suggest themselves to those skilled in the art. It is to be understood, however, that the present disclosure relates to the preferred embodiment of the invention which is not to be construed as a limitation of the invention. All such modifications which do not depart from the spirit of the invention are intended to be included within the scope of the appended claims.

What we claim is:

1. A defrosting apparatus including a housing defining a space for accommodating therein articles to be defrosted, a heat generating means for heating the air within said housing, and an air circulation fan for circulating the air heated by said heat generating means so that the heated air flows through said accommodating space, said apparatus further comprising:
   a first temperature detecting means disposed on the air outlet side of said heat generating means for sensing the temperature of the outlet air flowing out from said heat generating means to produce a first detection signal;
   a second temperature detecting means disposed on the air inlet side of said neat generating means for detecting the temperature of the air flowing into said heat generating means to produce a second detection signal; and
   a controller coupled to said first and second detection means for receiving said first and second detection signals, respectively, and for controlling the defrosting operation of said defrosting apparatus, said controller including a means for comparing the temperature represented by said second detection signal with a defrosting start temperature to energize said heat generating means when the former is lower than the latter, a means for comparing said first detection signal with a reference signal to selectively deenergize or energize said heating generating means on the basis of said reference signal, and a means for comparing the temperature represented by said second detection signal with a defrosting complete signal to stop said defrosting operation when the former is higher than the latter; wherein said reference signal has a saw-tooth wave having an upper limit level and a lower limit level, and wherein the difference between said upper and lower limit levels corresponds to a temperature difference of about 1° C., and wherein said heat generating means is deenergized when said first detection signal is of a magnitude greater than said lower limit level of said saw-tooth wave, whereby the temperature of the outlet air from said heat generating mean is maintained substantially constant minimizing the effect of outlet an temperature fluctuations of the termination of defrosting operation.

2. A defrosting apparatus according to claim 1, wherein said heat generating means is constituted by an electric heater disposed within said housing.

* * * * *